Feb. 22, 1966     T. W. DIETZ     3,236,345
ONE-WAY CLUTCH

Filed March 13, 1963     3 Sheets-Sheet 1

INVENTOR.
THEODORE W. DIETZ
BY Williams, David,
Hoffmann & Grant
ATTORNEYS

Feb. 22, 1966     T. W. DIETZ     3,236,345
ONE-WAY CLUTCH
Filed March 13, 1963     3 Sheets-Sheet 2
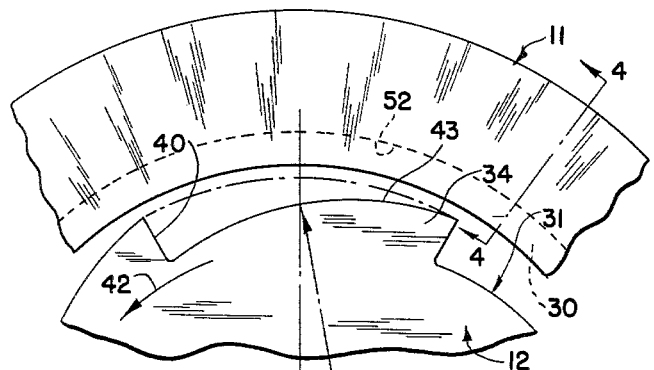
FIG.3
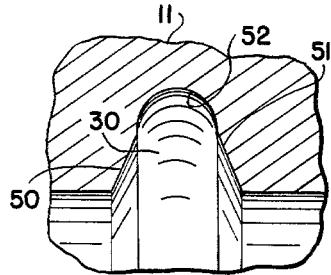
FIG.4
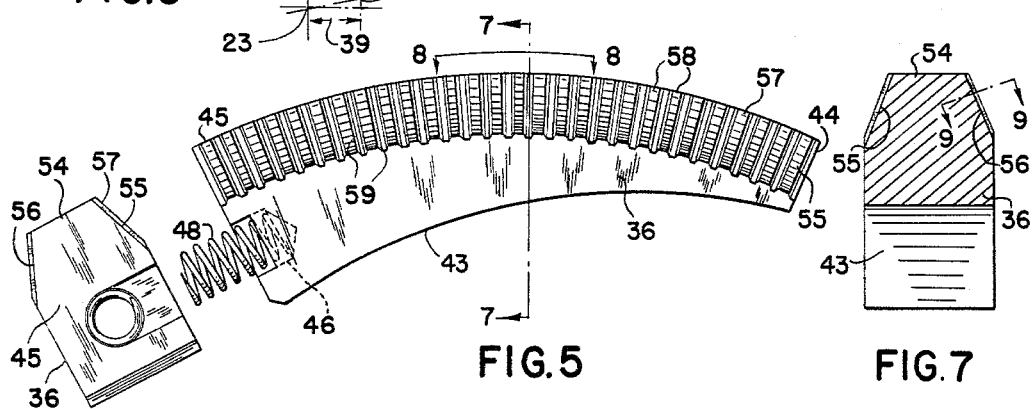
FIG.5     FIG.7
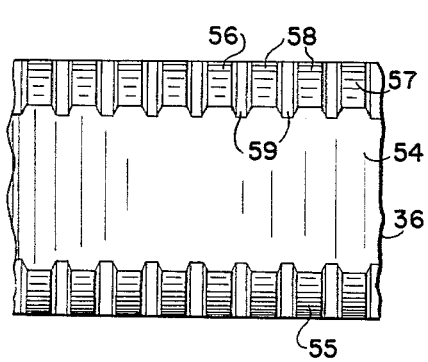
FIG.6
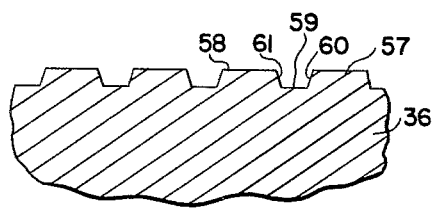
FIG.9
FIG.8
INVENTOR.
THEODORE W. DIETZ
BY *Williams, David,*
*Hoffmann & Fount.*
ATTORNEYS Feb. 22, 1966     T. W. DIETZ     3,236,345
ONE-WAY CLUTCH Filed March 13, 1963     3 Sheets-Sheet 3

INVENTOR.
THEODORE W. DIETZ
BY Williams, David,
Hoffmann & Fount.
ATTORNEYS

United States Patent Office 3,236,345
Patented Feb. 22, 1966

3,236,345
ONE-WAY CLUTCH
Theodore W. Dietz, South Euclid, Ohio, assignor to
Eaton Manufacturing Company, Cleveland, Ohio,
a corporation of Ohio
Filed Mar. 13, 1963, Ser. No. 264,817
1 Claim. (Cl. 192—45.1)

This invention relates to clutches and, as one of its objects, aims to provide a novel one-way clutch which is simple, practical and inexpensive in construction as well as efficient and reliable in operation.

Another object is to provide a novel one-way clutch of the type comprising a pair of clutch members and motion transmitting means between the clutch members and actuatable into gripping engagement with one clutch member by cam means on the other clutch member, and in the operation of which clutch the gripping engagement achieved is a strong and positive one with minimum slippage, is susceptible of being quickly released when desired, and the motion transmitted in the releasing or over-running direction due to frictional drag is extremely low.

A further object is to provide a novel one-way clutch of the above-indicated type in which the transmitting means has serrations disposed at an angle to the direction of the motion transmitting movement of the clutch for improving the clutch action and facilitating the gripping engagement.

Still another object is to provide a novel one-way clutch of the kind above referred to in which the clutch members comprise relatively rotatable outer and inner members and one of which members has an annular groove with wall means extending therealong and the transmitting means has serrations disposed at an angle to the direction of clutch rotation and co-operable with the wall means for producing the gripping engagement.

Additionally, this invention provides such a novel one-way clutch having a groove in a first clutch member into which a portion of the transmitting means is wedgingly forced by the cam means of the other clutch member, and wherein such first clutch member is highly resistant to breakage or splitting notwithstanding the presence of the groove therein.

Other objects, novel characteristics and advantages of this invention will be apparent in the following detailed description and in the accompanying drawings forming a part of this specification and in which, FIG. 1 is a vertical axial section through a one-way clutch of the novel construction provided by this invention, the view being taken on section line 1—1 of FIG. 2;

FIG. 3 is a fragmentary elevational view of a somewhat diagrammatic form showing portions of the outer and inner clutch members;

FIG. 4 is a partial transverse section, on a larger scale, taken through the grooved clutch member as indicated by section line 4—4 of FIG. 3;

FIG. 5 is a side elevation on an enlarged scale showing one member of the motion transmitting means in detached relation;

FIG. 6 is an end view of such one motion transmitting member;

FIG. 7 is a transverse section through such one motion transmitting member taken on section line 7—7 of FIG. 5;

FIG. 8 is a partial top plan view of such one motion transmitting member as indicated by the line 8—8 of FIG. 5;

FIG. 9 is a fragmentary sectional view on a still larger scale taken through such one motion transmitting member as indicated by section line 9—9 of FIG. 7 and further showing the shape of the serrations;

Figure 1:
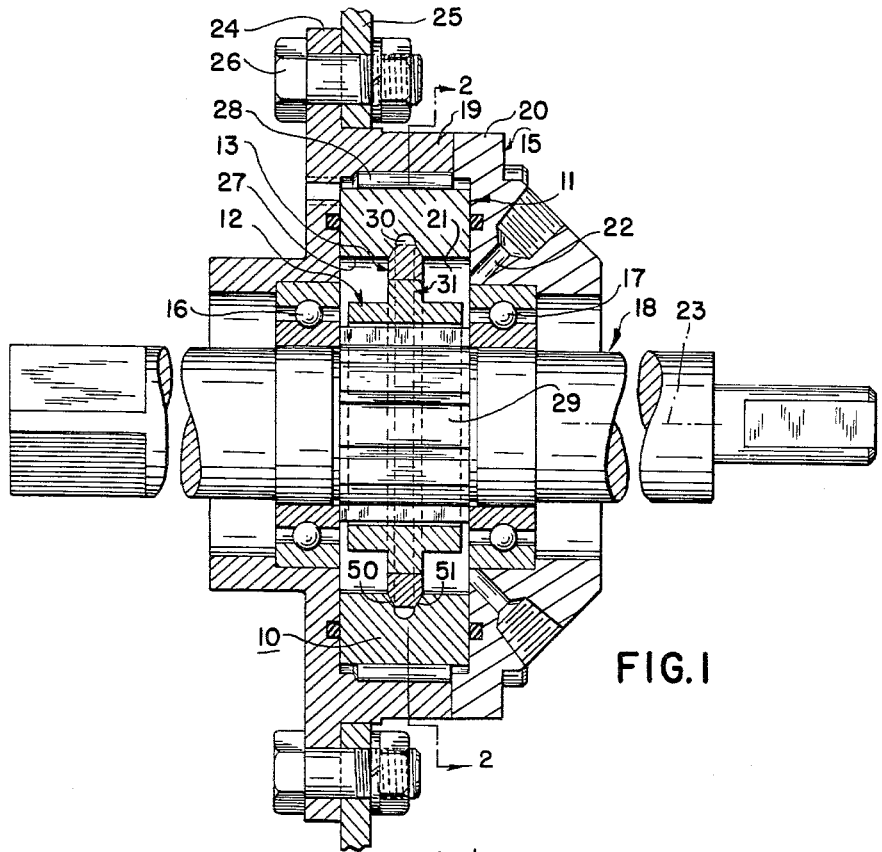
Figure 2:
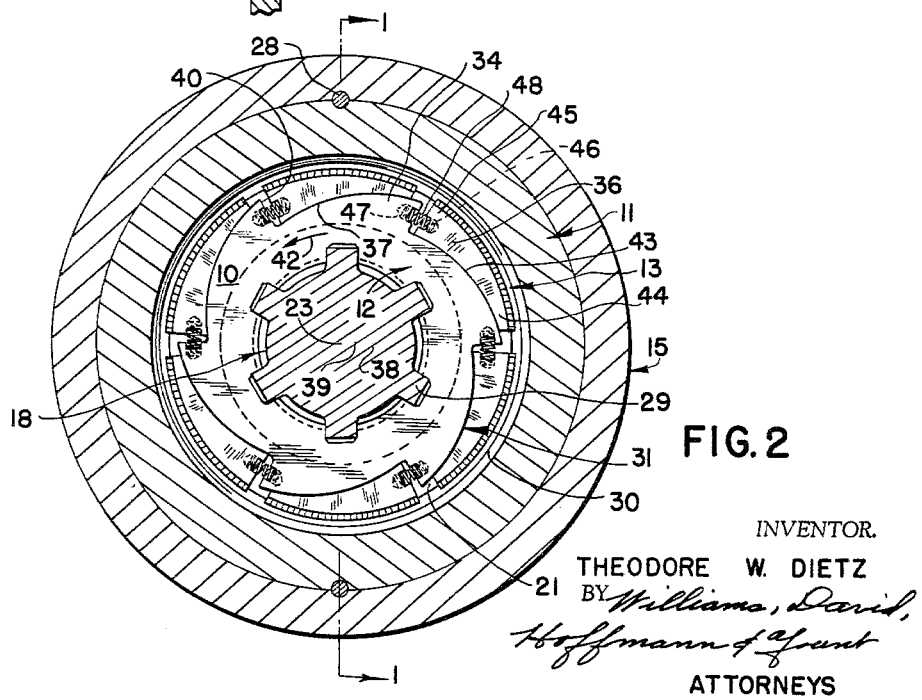
FIG. 2 is a transverse section taken on section line 2—2 of FIG. 1.

As one embodiment of the present invention, FIGS. 1 and 2 of the drawings show a one-way clutch 10 comprising first and second clutch members 11 and 12 and motion transmitting means 13 effective between the clutch members for transmitting driving force therebetween. The one-way clutch 10 is shown in FIGS. 1 and 2 as including a housing 15 having spaced antifriction bearings 16 and 17, and shaft means 18 rotatable in such bearings.

The housing 15 is of a suitable construction and is here shown as comprising connected housing sections 19 and 20 and as having a chamber 21 to which lubricant is adapted to be supplied through an inlet passage 22. The housing 15 and the shaft means 18 are relatively rotatable on a common axis 23 so that one of these members can be a power input member and the other member can be a power output member. The housing 15 includes a flange or the like 24 with which a driving or driven member 25, such as a gear member, can be connected as by suitable screws 26.

The first clutch member 11 is here shown as being an outer annular clutch member or race, and the second clutch member 12 is shown as being an inner clutch member or race located in the central axial opening 27 of the outer clutch member. The outer clutch member 11 is suitably locked or keyed in the chamber 21 of the housing 15 as by means of dowel pins 28, and the inner clutch member 12 is secured on the shaft means 18 as by means of a spline connection 29 therebetween. One of the clutch members, in this case the outer clutch member 11, is provided with an annular groove 30 into which portions of the motion transmitting means 13 extend as will be further explained hereinafter, and the inner clutch member 12 has cam means 31 thereon effective on the transmitting means 13 for causing a gripping engagement of the latter with the outer clutch member.

Although the one-way clutch 10 is shown in FIGS. 1 and 2 as having the groove 30 located in the outer clutch member 11 and the cam means 31 on the inner clutch member 12, this relationship can be reversed if desired, as in the modified construction shown in FIGS. 10, 11 and 12 and further described hereinafter, wherein the groove is in the inner clutch member and the cam means is on the outer clutch member.

The cam means 31 of the inner clutch member 12 comprises an annular group of cam portions, in this case six such cam portions 34, circumferentially spaced around the rotation axis 23 as shown in FIG. 2. The motion transmitting means 13 likewise comprises an annular group of members, in this case six wedge members 36, which are located adjacent the respective cam portion 34. The cam portions 34 resemble the teeth of a ratchet member and each cam portion has a convexly curved peripheral thrust surface 37 extending arcuately along the top thereof. The cam portions 34 are of an arcuate length depending upon the number of such cam portions employed and, when the cam means 31 comprises six of the cam portions 34 as shown in FIG. 2, each cam portion has an arcuate length of somewhat less than 60 degrees.

The thrust surface 37 has a center of curvature 38 which, for each cam portion 34, is offset from the rotation axis 23 by a suitable dimensional distance 39 so that the thrust surface will have a predetermined slope angle and, at one end thereof, will dip inwardly toward the rotation axis a sufficient distance so that the adjacent cam portion will have an end surface 40 lying substantially on a radial line extending through the rotational axis. The end surfaces 40 of all of the cam portions 34 face circumferentially in the same direction around the rotation axis 23, in this case, in a clockwise direction.

If it is assumed that the shaft means 18 is the power input means, the normal direction of the rotation of the inner clutch member 12 for supplying driving torque to the outer clutch member 11 is counterclockwise as indicated by the directional arrow 42 of FIG. 2. For this direction of rotation of the inner clutch member 12 the end surfaces 40 of the cam portions 34 will be the trailing ends of such cam portions, and the end portions of the thrust surfaces 37 adjacent such end surfaces 40 will be the high ends of the curved cam portions.

The wedge members 36 are all of a truncated-crescent shape and each such wedge member has a concavely curved thrust surface 43 on the inner side thereof which has the same radius of curvature as the thrust surface 37 of the associated cam portion 34 and is slidably engaged by the latter. The thrust surfaces 37 of the cam portions 34 and the thrust surfaces 43 of the wedge members 36 are all smooth or plain thrust surfaces so that rotation of the inner clutch member 12 in the counterclockwise direction indicated by the arrow 42 will produce a freely slidable wedging engagement of the thrust surfaces 37 against the respective thrust surfaces 43 so that the wedge members 36 will be forced outwardly, and the annular group of such wedge members expanded radially, toward the outer clutch member 11 to produce a clutch engaged co-operation of the wedge members with the latter as will be further explained hereinafter.

Because of the truncated-crescent shape of the wedge members 36, each wedge member will have a thin end portion 44 lying adjacent the high end of the associated thrust surface 37 and a thick end portion 45 in an opposed adjacent relation to the end surface 40 of the next adjacent cam portion 34. A compression spring 48 is disposed between the thick end 45 and the adjacent end surface 40 and is retained in place by suitable means, in this case, by having the ends of the spring received in aligned shallow recesses or bores 46 and 47. The springs 48 normally urge their associated wedge members 36 in a clockwise direction along the thrust surfaces 37 for facilitating the gripping engagement of the wedge members with the outer clutch member 11.

Rotation of the outer clutch member 11 in a counterclockwise direction at a faster rate than the counterclockwise rotation of the inner clutch member 12 produces an overrunning condition for the coupling 10 by which a tendency is produced for the wedge members 36 to be carried along with the outer clutch member in opposition to the expansive action of the springs 48. Whenever such an overrunning rotation of the outer clutch member 11 occurs, it will therefore automatically shift the wedge members 36 in a counterclockwise direction and cause the gripping engagement thereof with the outer clutch member to be released.

The annular groove 30 of the outer clutch member 11 has opposed annular side walls 50 and 51 (see FIG. 4) extending along opposite sides thereof and the groove is of a convergent cross-sectional shape for a direction of movement of portions of the wedge members 36 into such groove. The groove 30 is in an internal relation in the outer clutch member 11 and is in open communication with the chamber 21 containing the supply of lubricant. The side walls 50 and 51 are flat transversely thereof and are inclined at a suitable angle and extend in a smooth continuous relation along opposite sides of the groove 30 adjacent the portion thereof which is in such open communication with the chamber 21.

The portions of the side walls 50 and 51 lying more remote from the chamber 21 are connected by an annular bottom wall 52 of a transversely-curved concave shape. The curvature of the bottom wall 52 is here shown as approaching, or being, approximately that of a semi-circle and merging smoothly with the side walls 50 and 51. The provision of such a concavely curved shape for the bottom wall 52 of the groove 30 prevents weakening of the outer clutch member 11 and enables the latter to strongly resist breakage or splitting thereof due to wedging engagement of the wedge members 36 in the groove 30.

Because of the oppositely-inclined positioning of the annular side walls 50 and 51 of the groove 30, these side walls present smooth and annularly continuous thrust surfaces in a favorable position for the wedging and gripping engagement of portions of the wedge members 36 therewith. The portions of the wedge members 36 which extend into the groove 30 are top portions 54 of a beveled shape as shown in FIGS. 6 and 7. The beveled top portion 54 of each wedge member 36 accordingly has oppositely inclined sides 55 and 56 which co-operate respectively with the side walls 50 and 51 of the groove 30 and are pressed thereagainst with a wedging action as the wedge member 36 is forced outwardly into the groove by its associated cam portion 34. This wedging movement of the wedge members 36 into the groove 30 results in a gripping engagement between the sides 55, 56 of the wedge members and the side walls 50, 51 of the groove 30 whereby the wedge members strongly grip the outer clutch member 11 for transmitting driving torque thereto.

To increase the gripping engagement of the wedge members 36 with the outer clutch member 11 in response to the wedging movement into the groove 30, the sides 55, 56 of the beveled top portion 54 of each wedge member are provided with serrations 57. The serrations 57 are here shown as comprising teeth or lands having flat top surfaces 58 and slot-like recesses 59 between such lands. The provision of the serrations 57 on the sides of the beveled top portions 54 of the wedge members 36 enables such beveled portions to more strongly grip the outer clutch member 11 because the serration teeth or lands readily bite through the lubricant film on the side walls 50 and 51 with a resulting direct metal-to-metal engagement of the flat top land surfaces with such side walls, and consequently, slippage between the wedge members and the outer clutch member will be substantially prevented.

The serrations 57 are disposed on the wedge members 36 at an angle to the direction of the driving movement of the clutch and, in the case of the rotatable clutch 10, the serrations extend at an angle to the direction of clutch rotation. In FIGS. 2 and 5 the serrations 57 are shown as extending in a direction which is generally radial to the direction of rotation of the clutch 10.

In the functioning of the clutch 10 the achievement of the strong gripping engagement of the wedge members 36 with the outer clutch member 11 results also from the fact that the recesses 59 between the serration 57 have oppositely inclined sides 60 and 61 formed by the adjacent sides of the serration lands. The inclination of the serration side walls 60 and 61 is shown in FIGS. 8 and 9 and facilitates the gripping engagement of the wedge members with the sides of the groove 30 even though lubricant present in the groove may be at a low temperature such as a below zero (F.) temperature.

Figure 10:
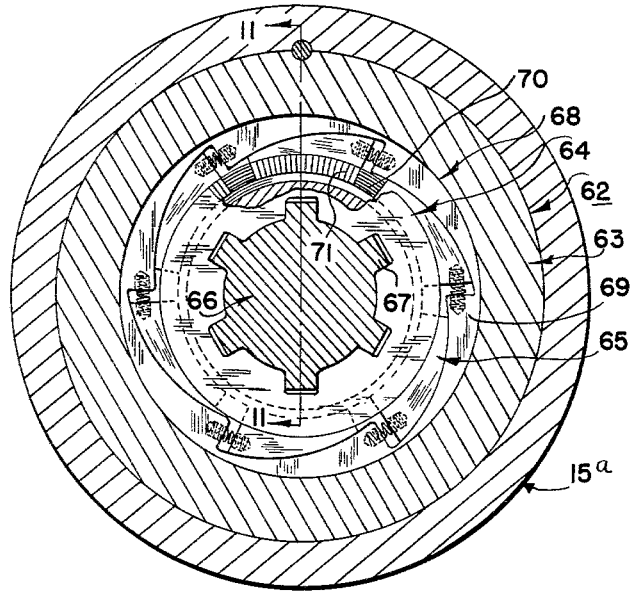
FIG. 10 is a view similar to the transverse section of FIG. 2 but showing a one-way clutch of a modified construction.
Figure 11:
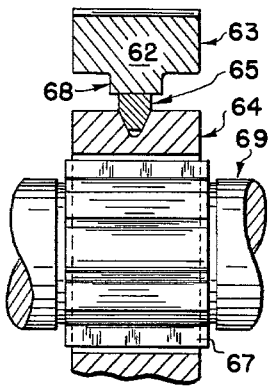
FIG. 11 is a partial axial section taken on section line 11—11 of FIG. 10.
Figure 12:
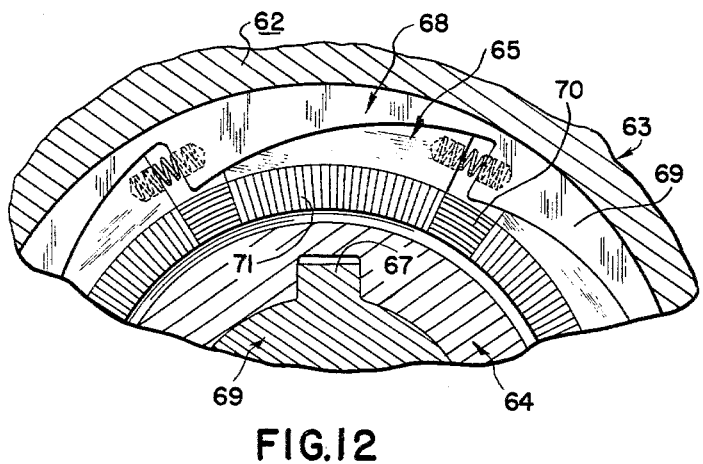
FIG. 12 is a fragmentary transverse section corresponding with a portion of FIG. 10 and showing such portion on a larger scale.

FIGS. 10, 11 and 12 of the drawings show a one-way clutch 62 of the same type as the above-described one-way clutch 10 but embodying a modified construction. The modified one-way clutch 62 resembles the one-way clutch 10 in that it comprises first and second clutch members 63 and 64 in the relationship of outer and inner clutch members, and an annular group of wedge members 65 for transmitting driving torque therebetween. In the modified one-way clutch 62 the outer clutch member 63 is in the form of an annular member or race suitably connected with an outer housing 15ª, and the inner clutch member 64 is in the form of an annular member or race which is connected with a rotatable shaft 66 as by spline means 67.

The modified one-way clutch 62 differs from the one-way clutch 10 in that a cam means 68 comprising an annular group of cam portions 69 is provided on the outer clutch member 63, and an annular groove 70 is provided in the periphery of the inner clutch member 64 in which serrated gripping portions 71 of the wedge member 65 are received. In other respects the modified one-way clutch 62 is similar to the one-way clutch 10 and functions in a similar manner.

It is usually desirable that the one-way clutch 10 (or the clutch 63) be as small and compact as possible inasmuch as it is frequently incorporated in an automobile transmission or other mechanism where only limited space is available. Consequently, when the outer and inner clutch members 11 and 12 are made of a size to have the strength necessary to transmit the rated torque load for which the one-way clutch is being designed, the intervening annular space between the grooved clutch member and the cam portions of the other clutch member is relatively narrow or small and there is only a limited amount of space available to accommodate the wedge members 36. This condition is also affected by the requirement that the cam portions 34 and the thrust surfaces 41 be of a size and shape suitable for producing proper clutch-engaging and clutch-disengaging functions during the operation of the clutch.

Therefore, since the wedge members 36 are limited as to the size they can have, the presence of the above-described serrations 57 is very important for achieving the desired strong gripping engagement between the wedge members and the grooved clutch member 11. The small size which the wedge members 36 have, in accordance with the construction provided by this invention, results in another advantage in that the wedge members will be of small mass and will be subjected to only a minimum amount of centrifugal force during the operation of the clutch.

From the accompanying drawings and foregoing detailed description it will now be understood that this invention provides a novel one-way clutch of a simple but highly practical construction and one which will function efficiently and reliably under varying loads and operating conditions and will have a long life even though the clutch may be overloaded or otherwise subjected to unfavorable conditions.

Although the novel one-way clutch of this invention has been illustrated and described herein to a somewhat detailed extent, it will be understood, of course, that the invention is not to be regarded as being correspondingly limited in scope but includes all changes and modifications coming within the terms of the claim hereof.

Having described my invention, I claim:

In a one-way clutch, a housing defining a chamber, inner and outer clutch members relatively rotatable about a common axis and located in said chamber, said outer clutch member encircling said inner clutch member with an intervening space therebetween adapted to be supplied with a lubricant, said inner clutch member comprising a continuous annular ring-like portion having a splined inner periphery and an outer periphery bounded by a series of circumferentially spaced arcuate cam portions, said outer clutch member comprising a continuous annular ring-like portion with means associated therewith for preventing relative rotation between said outer clutch member and said housing, said intervening space being defined at one radial extremity by an axially extending peripheral surface of one of said clutch members which surface includes a portion defining a circumferentially extending groove in said one of said clutch members communicating with said space and at the other radial extremity by an axially extending peripheral surface of the other of said clutch members which surface includes said cam portions extending radially therefrom and toward said groove, said groove having annular side walls oppositely inclined so that the cross-sectional shape of the groove is converging from a direction of movement into the groove and on which a lubricant film is formed, wedge members in said annular groove for transmitting driving torque between said clutch members during one direction of clutch rotation, said wedge members being in said space between said clutch members and individually located adjacent respective cam portions, each of said wedge members comprising a thrust surface engaged by a cam portion, an annular surface opposite said thrust surface and oppositely beveled surfaces intersecting said annular surface, said beveled surfaces extending toward and intersecting with radially extending planar side surfaces of the wedge members, said planar side surfaces extending from said beveled surfaces to the thrust surface of each wedge member, said beveled surface portions of each wedge member extending at an angle corresponding to the angle of inclination of said side walls of said groove and intersecting said annular surface and said radially extending opposite planar side surfaces of each of said wedge members, serrations in the form of lands on said beveled portions extending transversely to the direction of rotation of said side walls for biting through said lubricant film and frictionally grippingly engaging said inclined side walls in response to said thrust action, spring means between each of said wedge members and a portion of said other clutch member for urging the wedge members along its associated cam portion and toward gripping engagement with said groove, said groove having a bottom surface portion spaced from the annular surface of the wedge members when in driving position, said bottom surface portion of said groove having a concave substantially constant radius of curvature extending transversely of the groove and merging smoothly with the opposite side walls defining said groove with the diametrical extent of the curvature being substantially equal to the width of said annular surface of the wedge members.

References Cited by the Examiner

UNITED STATES PATENTS

| | | | |
|---|---|---|---|
| 1,465,492 | 8/1923 | Smith et al. | 192—107 |
| 1,912,407 | 6/1933 | Sahli | 192—41 |
| 2,013,413 | 9/1935 | Lazzarini | 192—41 |
| 2,039,149 | 4/1936 | Dodge | 192—45.1 |
| 2,297,166 | 9/1942 | Robin et al. | 192—45.1 |
| 2,349,925 | 4/1944 | Andreau | 192—41 |
| 2,510,032 | 5/1950 | Hood | 192—6 |
| 3,092,227 | 6/1963 | Dossier | 192—41 |
| 3,107,764 | 10/1963 | Fulton | 192—41 |

FOREIGN PATENTS 436,727    6/1948    Italy.

DAVID J. WILLIAMOWSKY, *Primary Examiner.*